A. MOFFITT.
CARRIAGE THILLS AND POLES.

No. 191,459. Patented May 29, 1877.

Witnesses:
P. K. Dietrich
Frank H. Duffy

Inventor:
Alexander Moffitt
Per C. H. Watson & Co., Attorneys.

UNITED STATES PATENT OFFICE.

ALEXANDER MOFFITT, OF WASHINGTON, DISTRICT OF COLUMBIA, ASSIGNOR TO HIMSELF AND C. H. WATSON, OF SAME PLACE.

IMPROVEMENT IN CARRIAGE THILLS AND POLES.

Specification forming part of Letters Patent No. 191,459, dated May 29, 1877; application filed May 15, 1877.

*To all whom it may concern:*

Be it known that I, ALEXANDER MOFFITT, of Washington, in the District of Columbia, have invented certain new and useful Improvements in Carriage Thills and Poles; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to carriage thills and poles, having for its object to furnish thills and poles with a flexible cushion upon their outer ends, which shall be simple and cheap in construction and application, and neat in appearance, whereby accidents are avoided by a thill or pole striking another horse or vehicle and injuring the same, and whereby the rigidity of the thill or pole is preserved, as will be hereinafter more fully described.

Figure 1:
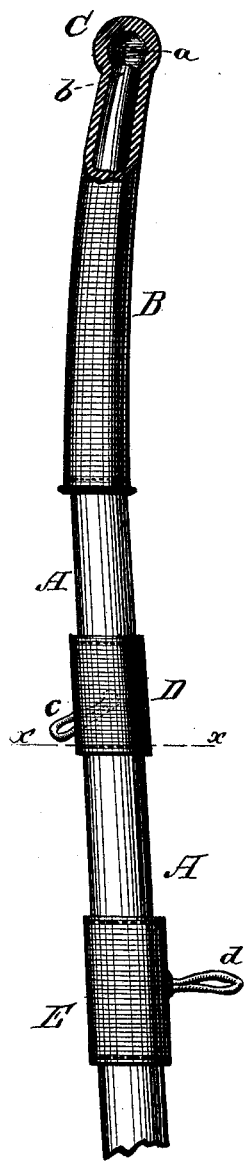
Figure 3:
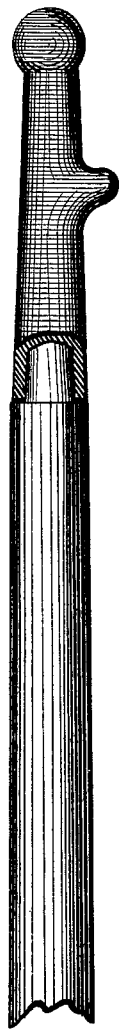
Figure 2:
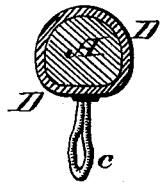

In the annexed drawings, Figure 1 is a side elevation of a thill, showing my improvement, with a portion of the front portion broken away, and shown in section. Fig. 2 is a transverse section of the same, taken on line $x\ x$ of Fig. 1; and Fig. 3 shows my improvement attached to a pole.

A represents the ordinary thill, provided with an elastic sleeve, B, which is provided at the forward end with an elastic cushion, C. This cushion forms a part of the sleeve, and I preferably make it in circular form, although the form is not essentially material. It is made of india-rubber or other elastic material, and hollow in the center, as shown at $a$, Fig. 1, so as to give it the desired degree of elasticity.

The thill extends the entire or nearly the entire length of the sleeve B, as shown at $b$, so that the entire shaft, up to or nearly up to the cushion, is rigid.

D and E represent the trimmings of the thill, which may be made of elastic material, if desired, and provided with a holdback-loop, $c$, and a trace-holder, $d$. These parts are susceptible of being highly finished, and, being elastic, will accommodate themselves to different-sized thills. They are not liable to become as quickly worn as leather, and as there are no stitches or perforations the water does not enter to rot the parts, as in the leather trimmings in general use.

In Fig. 3 the invention is shown as applied to a pole, being the same in principle as above described.

In use, accidents are very common in using wood or metallic tipped thills and poles, and many horses and people have been killed, and others severely injured, by coming in sudden contact with the same, and many carriages have been injured by another being driven up rapidly behind them, and the thills or pole striking the forward carriage.

By my invention all these objections are obviated, and my improvement costs less than the ordinary leather coverings and metallic tips in general use.

I am aware that thills have been used having the entire forward part formed of rubber, and covered with metal tips, and I do not, therefore, claim such as my invention; but,

Having thus fully described the invention, what is claimed as new, and desired to be secured by Letters Patent, is—

1. A thill or pole provided at its forward end with an elastic cushion, C, covering the end of the thill or pole, substantially as and for the purpose set forth.

2. The combined elastic cushion C and sleeve B, with a thill or pole, substantially as and for the purpose set forth.

In testimony that I claim the foregoing I have hereunto set my hand.

ALEXANDER MOFFITT.

Witnesses:
WM. B. UPPERMAN,
FRANK GALT.